United States Patent [19]

Clapper

[11] 4,299,245
[45] Nov. 10, 1981

[54] FILTER CLEANING SYSTEM

[76] Inventor: Millard F. Clapper, Terrace Dr. R.D. #3, Binghamton, N.Y. 13901

[21] Appl. No.: 141,964

[22] Filed: Apr. 21, 1980

[51] Int. Cl.$^3$ .......................... B08B 3/02; B08B 9/00
[52] U.S. Cl. .................... 134/140; 134/144; 134/152; 134/170; 134/200; 118/318; 118/321
[58] Field of Search ............... 134/102, 138, 140, 144, 134/148–149, 152–153, 167 R–168 R, 170, 200, 172; 118/318, 320–321

[56] References Cited

U.S. PATENT DOCUMENTS

| | | | |
|---|---|---|---|
| 2,471,506 | 5/1949 | Wiswall | 134/153 X |
| 2,628,628 | 2/1953 | Hertz | 134/148 X |
| 2,756,455 | 7/1956 | Slaughter, Sr. | 134/153 X |
| 3,070,103 | 12/1962 | Pickard et al. | 134/144 X |
| 3,073,325 | 1/1963 | Rebizzo et al. | 134/153 X |
| 3,174,490 | 3/1965 | Flarsheim | 134/153 X |
| 3,236,249 | 2/1966 | Everroad | 134/167 R |
| 3,442,273 | 5/1969 | Hanish et al. | 134/140 X |
| 3,606,897 | 9/1971 | Tobin et al. | 134/144 X |
| 3,620,234 | 11/1971 | Everroad | 134/102 X |
| 3,624,750 | 11/1971 | Peterson | 134/153 X |
| 3,650,283 | 3/1972 | Lang | 134/140 X |
| 3,799,178 | 3/1974 | Anderson et al. | 134/172 X |
| 3,998,656 | 12/1976 | Grotto | 134/153 X |

Primary Examiner—Robert L. Bleutge
Attorney, Agent, or Firm—George E. Clark

[57] ABSTRACT

A cleaning system for cleaning cylinrical filters includes a housing having an opening on one side thereof, a motor driven turntable for supporting a filter to be cleaned, a plurality of spray nozzles selected to provide spray at predetermined heights and at predetermined distances from the perimeter of the filter to be cleaned, a high pressure pump for supplying cleaning fluid to the cleaning nozzles and first and second rinse nozzles, the first rinse nozzle being adjustable in both the vertical and horizontal directions relative to the filter to be cleaned, the second nozzle being horizontally adjustable to clean the bottom pan of the filter to be cleaned, the first and second rinse nozzles being connected to a water source at normal main pressure. Each of the external wash nozzles above a predetermined height from the bottom of the filter being individually controllable to provide a proper wash spray for optimum cleaning of a filter. The exterior wash nozzles being connected to a common conduit and being adjustable as a unit in the horizontal direction relative to the filter to be cleaned.

4 Claims, 4 Drawing Figures

FILTER CLEANING SYSTEM

BACKGROUND OF THE INVENTION

The present invention relates to cleaning apparatus, more particularly to apparatus for cleaning cylindrical filters having different heights and differing diameters.

In the prior art there are many systems for cleaning cylindrical filters. The following patented devices were noted as relating to cleaning of cylindrical filters.

U.S. Pat. No. 2,471,506, shows a spray type washing machine for solid objects, having a front opening door, a rotating work support member and a plurality of spray nozzles which are directionally adjustable. Various valves are located on the machine to control selection of the washing liquid, fresh water and draining. The system of this patent does not include means for adjusting the wash nozzles in a horizontal plane relative to the filter to be cleaned. Neither does the system include rinse nozzles adjustable in the horizontal as well as vertical plane relative to the filter to be cleaned. The patented system includes a complex plumbing structure requiring a large number of valves and piping to achieve the object of the patent.

U.S. Pat. No. 2,756,455, shows a fuel oil strainer cleaner having a tubular shape with access gained through a hinged top support closure plate. A rotatable support is located at the bottom of the cleaner which allows the strainer to rotate as it is cleaned. A header pipe, with a plurality of jets, extends longitudinally within the casing and is secured in the bottom. This patented system employs a fixed conduit having a plurality of nozzles running in a vertical direction along the outer edge of a strainer to be cleaned. There is no provision for cleaning the inner surface of the strainer and thus provides an incomplete cleaning of the device. Further, the patented system requires locating pins on a bottom plate holding the strainer in place and a compression means pressing on the top of the strainer to be cleaned to maintain the strainer in proper position.

U.S. Pat. No. 3,073,325, shows drum washer having a cabinet with suitable doors, a rotating support driven by a motor and a plurality of spray nozzles directed at the sides and top of the drum. A spray nozzle is also directed from the center of the rotating support to clean the interior of the drum. As with the prior art previously discussed, the system of the patent identified has a plurality of fixed nozzles which provide an overlapping spray to the exterior of the surface of the drum. The fixed nozzles cannot provide proper spray coverage and pressure for smaller or larger sized drums then an optimum for which the system is designed. Further, the interior spray nozzle provides a non-uniform spray since those areas of the interior of the drum near the bottom of the drum will receive greater cleaning fluid pressure than near the top or top corners. The system of the referenced patent does not provide uniform cleaning of the interior surface of the drum.

U.S. Pat. No. 3,174,490, shows a filter washing machine being mobile and self-contained or adapted for coupling to utilities. The unit consists of a housing, a motor driven rotating drum, perforated spray tubes, motor driven pumps, control valves, reservoirs for the cleaning solution and electrical controls. The system shown by the patent referenced does not provide adjustable means for cleaning the exterior surface of a filter. Neither is there provided adjustable means for rinsing the exterior surface of the filter.

U.S. Pat. No. 3,442,273, discloses a filter washing apparatus, having filter support rollers to rotate the filter element, external and internal spray pipes having a plurality of nozzles, valving arrangements to permit the operator to select the washing pipe, solution for washing and a hand held spray head for spot rinsing. The system of the referenced patent does not provide adjustable nozzles and further requires operator intervention for cleaning or rinsing certain portions of the filter to be cleaned with a separate hand held spray head.

U.S. Pat. No. 3,624,750, shows a parts washer, consisting of housing open at the top, a motor driven article support, a U-shaped spray manifold having a plurality of spray nozzles directed inwardly, a recirculating system and a rinsing mechanism for connecting the spray manifold mechanism to the rinsing liquid under pressure. The system of the referenced patent does not show internal spray nozzles for cleaning the inside surface of a filter, nor does it show that exterior spray nozzles are adjustable relative to the surface of the device to be cleaned and individually controllable to provide proper spray coverage for cleaning.

U.S. Pat. No. 3,650,283, shows a filter cleaner having rotatable support and spray means. The cleaning apparatus, being cylindrical in shape, has a hinged top mounted cover with a drive motor mounted thereon, and a drive shaft extending into the tank. Spray pipes, extending axially into the interior of the cleaner, have high velocity spray nozzles directed against the inner and outer surfaces of the filter element. In the system of the referenced patent, both the inner and outer spray nozzles are fixed in position and do not provide for adjustment based upon the height or diameter of a cylindrical filter to be cleaned. Further, the system of the referenced patent is designed primarily to handle a stack of smaller filters held together in compression.

U.S. Pat. No. 3,998,656, shows an apparatus for cleaning pleated paper and other hollow cylindrical filters. The apparatus cleans by means of rapid rotation and reverse air flow through the filter element. A rotatable platform supports one end of the element and a tapered centering drive member frictionally engages the element for rapid rotation. A vacuum is created on the exterior of the element by means of a simple vacuum cleaner.

The system of the referenced patent does not employ a water based cleaning system including interior and exterior adjustable nozzles but rather uses air flow to remove dirt from the filter.

SUMMARY OF THE INVENTION

It is therefore a primary object of the present invention to clean cylindrical filters by means of apparatus including a rotating turntable for supporting a filter to be cleaned, an internal spray mechanism having a plurality of washing nozzles, an adjustable external apparatus having a plurality of nozzles each of said nozzles above a predetermined point being independently controllable, means for rotating said turntable and a pump for supplying a washing liquid at a high pressure to the internal and external nozzles.

It is another object of the present invention to clean cylindrical filters with apparatus such as above also including first and second adjustable rinsing nozzles separate from and independent from said internal and external washing nozzles.

It is another object of the present invention to clean cylindrical filters employing apparatus as described above wherein the internal nozzle structure is readily removable through the means of a quick disconnect coupling and may be replaced by a nozzle structure having a different length to provide proper cleaning of filters having different heights.

It is a feature of the present invention that cylindrical filters having a wide range of diameters and heights may be cleaned by apparatus according to the present invention through proper adjustment of the washing nozzles and the rinsing nozzles respectively.

Accordingly, apparatus according to the present invention includes a housing having a door opening on one side thereof, a rotating turntable support means for supporting a filter to be cleaned, a quick disconnect device for providing a washing spray to the interior surface of the filter to be cleaned, a plurality of external washing nozzles commonly adjustable for washing the exterior surface of a filter to be cleaned, each of the exterior nozzles above a pre-determined level being independently controllable to provide a proper washing spray while minimizing the quantity of water and energy required. The apparatus also includes first and second rinsing nozzles, the rinsing nozzles being adjustable to provide a proper rinse spray to the exterior of the filter to be cleaned.

These and other objects of the present invention will become immediately apparent from the following detailed description in conjunction with the accompanying drawing.

DETAILED DESCRIPTION OF A PREFERRED EMBODIMENT OF THE INVENTION

Figure 1:
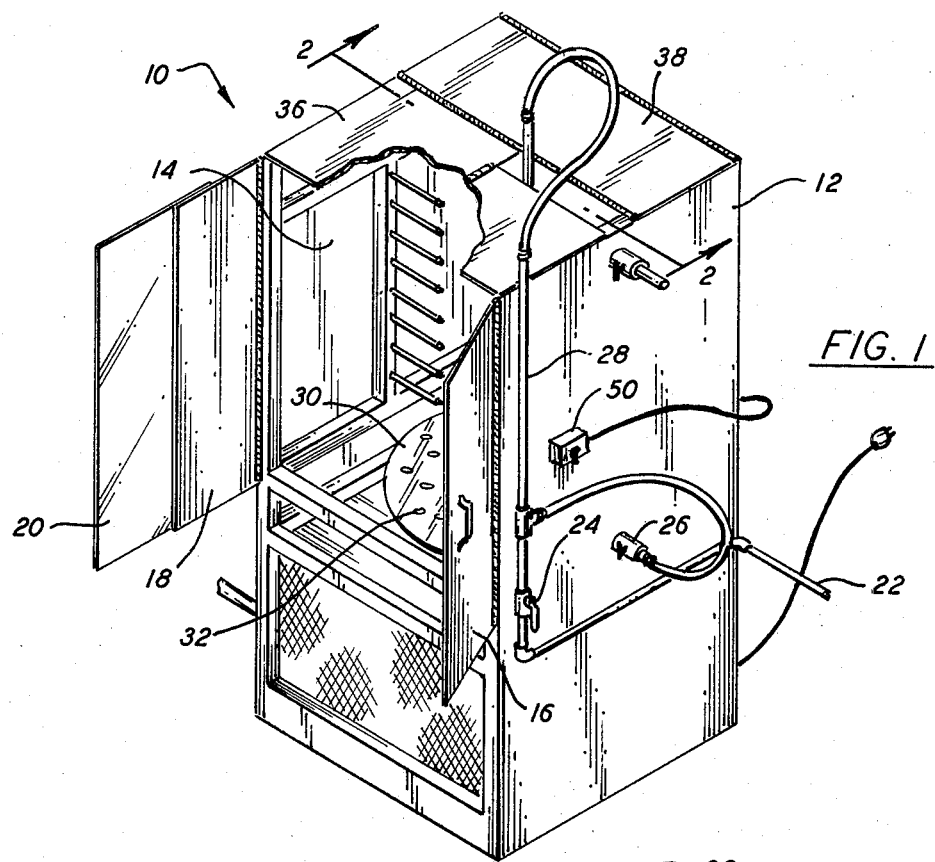
FIG. 1 is an isometric view of a cleaning apparatus according to the present invention.

Referring now to FIG. 1, filter cleaning system 10 includes a housing 12 having a front opening 14 which may be closed by means of doors 16 and 18. Door 18 has a plexiglass portion 20 for viewing the operation of the filter cleaning system by an operator.

Figure 2:
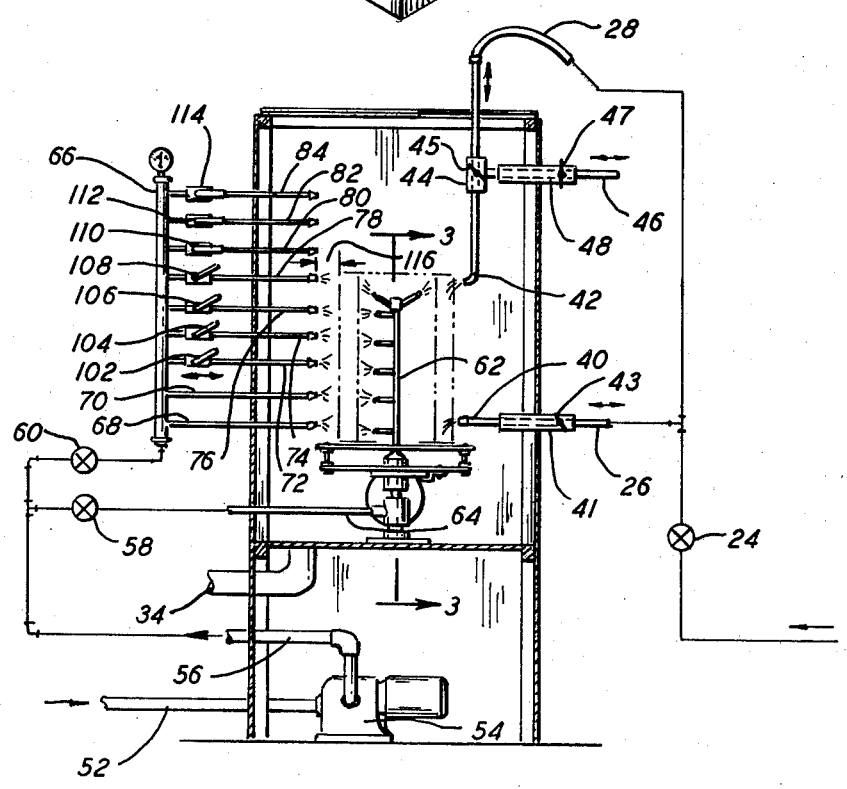
FIG. 2 is a section view of the cleaning apparatus shown in FIG. 1.

Water supply pipe 22 is connected through valve 24 to supply line 26 which supplies rinsing water to the bottom rinsing nozzle 40 (shown in FIG. 2) and through supply line 28 to top rinsing nozzle 42 (shown in FIG. 2).

A filter to be cleaned (not shown) is mounted on turntable 30 which has a plurality of drain openings 32 therein to allow water to drain out of the housing 12 through drain pipe 34 (see FIG. 2). Housing 12 also includes a front hinged portion 36 of top 38 for access to the interior of the housing from the top.

Also shown in FIG. 1 is main electrical control switch 50 which controls the application of power to an electrical motor (not shown) and to high pressure pump 54 shown in FIG. 2.

Figure 3:
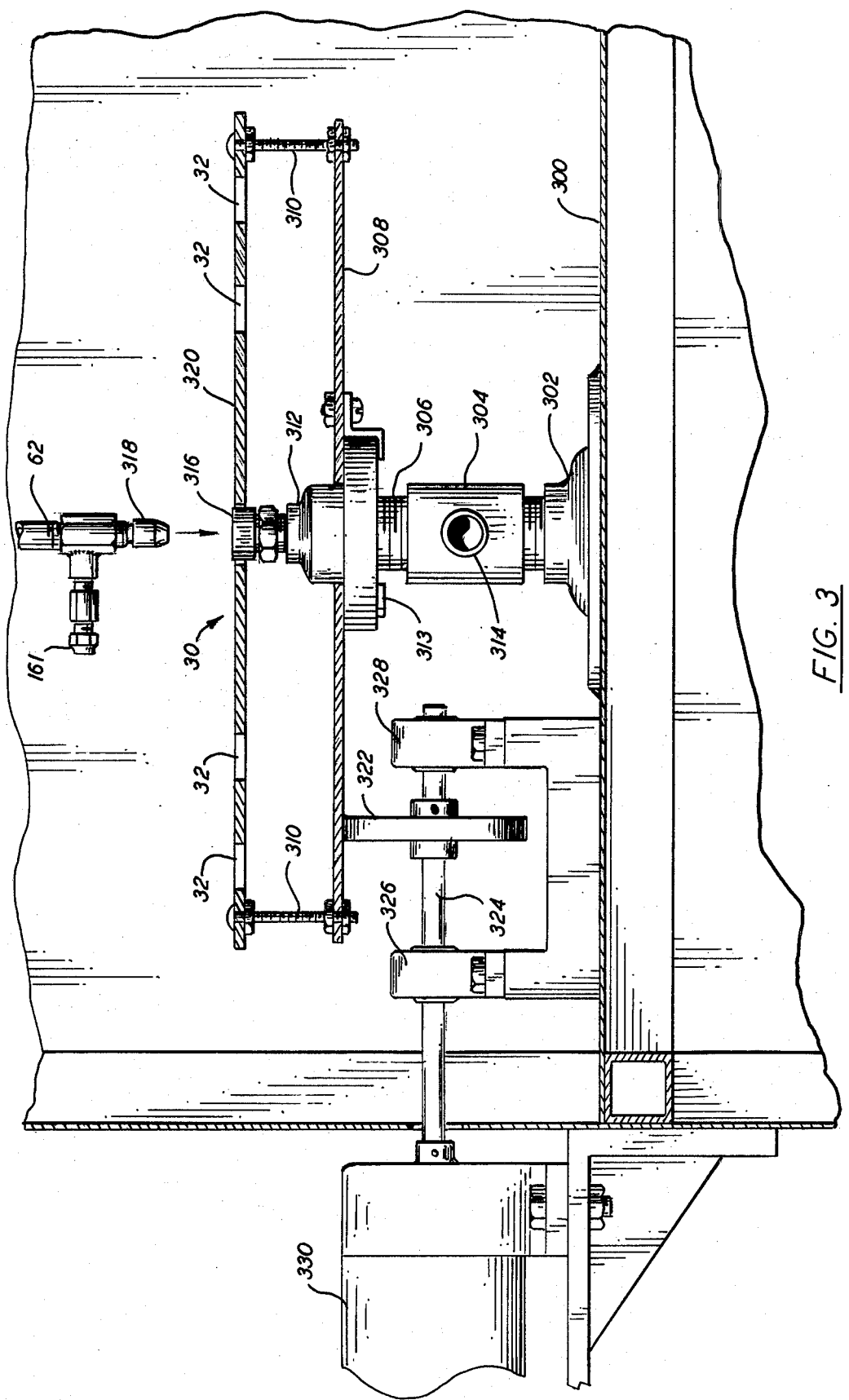
FIG. 3 is a further section view of the cleaning system shown in FIG. 2.
Figure 4:
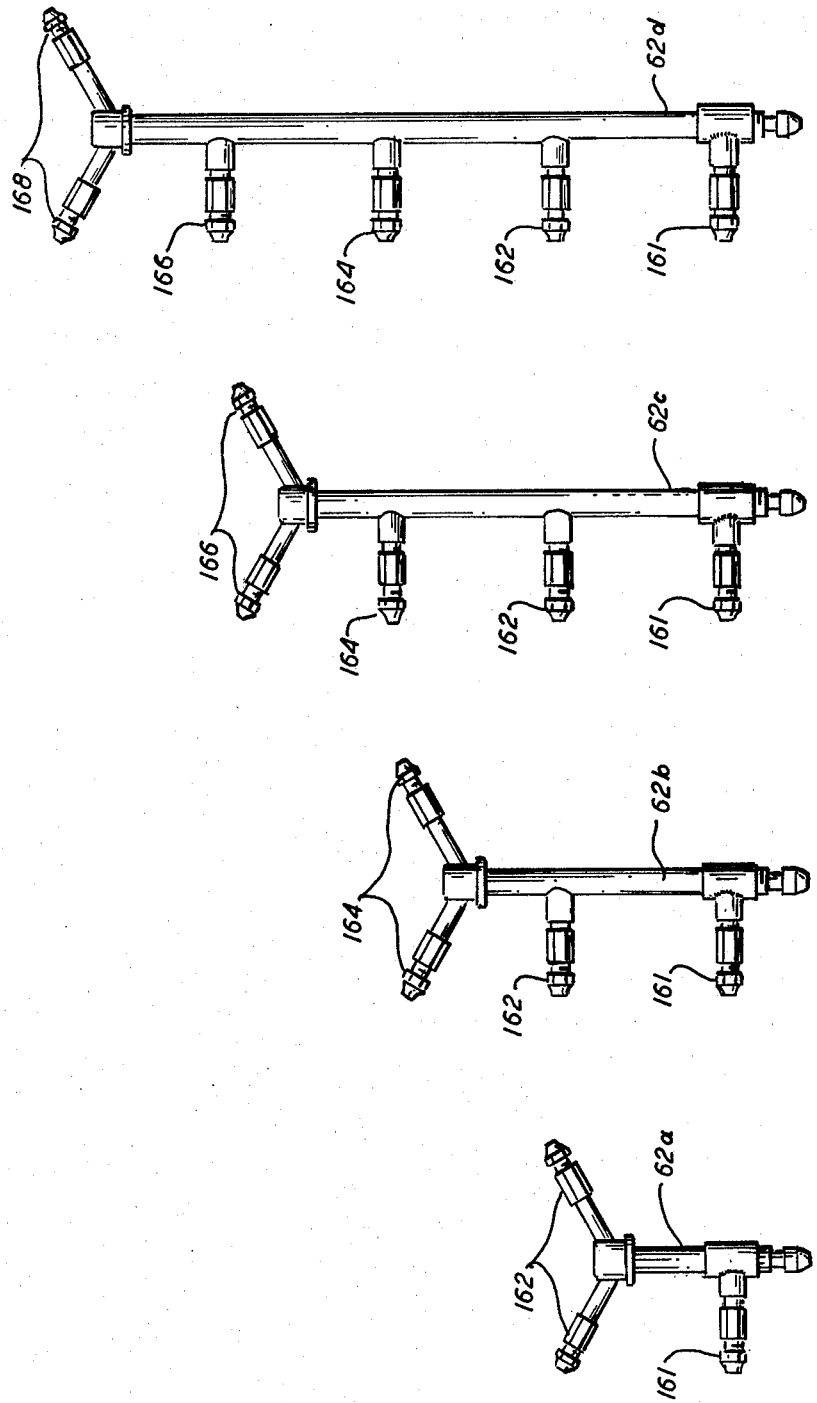
FIG. 4 is a view of a number of different sized interior spray nozzle devices which may be used with the cleaning system according to the present invention.

Referring now to FIGS. 2, 3 and 4, the hydraulic system of a preferred embodiment of the present invention will be described in greater detail.

A washing solution is supplied through pipe 52 to high pressure pump 54 which increases the hydraulic pressure to a level greatly above the water main pressure. The high pressure cleaning fluid is carried by pipe 56 to valve 58 which controls the application of the cleaning liquid to the internal nozzle device 62 through pipe 64 and through valve 60 to conduit 66 which supplies the pressurized cleaning liquid to exterior nozzles 68 and 70 directly and to exterior nozzle 72, 74, 76, 78, 80, 82 and 84 through independent control valves 102, 104, 106, 108, 110, 112 and 114 respectively. Conduit 66 is adjusted to place nozzles 68–84 at a pre-determined distance from the external surface of a filter to be cleaned to provide proper spray pressure and coverage at the filter surface yet a sufficient distance from the surface of the filter to prevent damage to the filter element. The adjustment of the distance 116 between the nozzles 68–84 and the exterior surface of a filter to be cleaned is very critical to the proper cleaning of a filter without damage to the filter.

It should be noted in the embodiment shown in FIG. 2, that valves 110, 112 and 114 are shown in the closed position which prevents the spraying of cleaning liquid into the area above the top of the filter to be cleaned thus preserving cleaning liquid, water and energy.

As was previously discussed, bottom rinse nozzle 40 and top rinse nozzle 42 are adjustable relative to the external surface of the filter for rinsing said filter. Bottom rinse 40 is horizontally adjustable in sleeve 41 and is held in proper position by locking device 43. Top rinse nozzle 42 is vertically adjustable in sleeve 44 and held in place by locking device 45. Horizontal adjustment of top rinsing nozzle 42 is made by sliding arm 46 through sleeve 48 and locking in proper position by locking device 47.

The mechanism of the rotating turntable and the cleaning liquid supply means to the internal nozzle structure 62 will be further described with respect to FIGS. 3 and 4.

Referring now to FIGS. 3 and 4, rotary turntable 30 is mounted on frame member 300 and supported by base 302 which supports pipe 304 and coupling 306 attached to driven plate 308. Driven plate 308 is supported by bearing 313 which is pressed to reducer 312. The driven plate 308 is attached to the filter support plate 320 by bolts 310 around the perimeter of the circular plates 308 and 320 and by center reducer 312. Circular driven plate 308 is driven by friction roller 322 mounted on shaft 324 and supported by bearings 326 and 328 which are mounted on frame member 300. Shaft 324 receives its motive power from an electric motor (not shown) through a gear reduction box 330 which reduces the high speed of an electric motor in the range of 1,800 rpm to 3,600 rpm to a speed of approximately 10 to 36 rpm as determined by the size and weight of the filter to be cleaned.

A cleaning liquid is supplied through conduit 64 to coupling 314 in pipe 304. Shaft 306 is hollow to allow the passage of the cleaning liquid to coupling 316. Coupling 316 is a quick release female adapter to accept male quick release member 318 on a selected one of internal spray nozzle structures 62.

Referring now to FIG. 4, a number of spray nozzles structure 62 are shown having differing heights and a different number of spray nozzles for cleaning filters of different sizes. Spray nozzle structure 62a includes nozzle 161 and a pair of nozzles 162 for cleaning the smallest size filter available. Similarly, nozzle structure 62b includes nozzles 161 and 162 pair of nozzles 164 for cleaning an intermediate size filter. Nozzle structure 62c includes nozzles 161, 162, 164 and a pair of nozzles 166 for cleaning a slightly larger filter. Nozzle structure 62d includes nozzle 161, 162, 164, 166 and a pair of top nozzles 168 for cleaning a still larger size filter. It is evident, that filters of larger size could also be cleaned employing internal spray nozzle structures having additional pairs of spray nozzles.

The filter cleaning system according to the present invention is efficient and rapidly cleans filters without damaging the internal structure of the filter due to excessive pressure caused by having a nozzle too close to the filter surface.

Although a preferred embodiment of the invention has been described, it will be apparent to those skilled in the art that there are many variations and modifications which may be made without departing from the spirit or scope of the invention. Therefore, the invention is not to be limited by the specific disclosure of a preferred embodiment herein, but only by the appended claims.

What is claimed is:

1. Apparatus for cleaning filters, comprising:

An enclosed housing; a rotary turntable mounted within said housing for supporting said filter to be cleaned;

A first spray mechanism having a plurality of washing nozzles for washing an interior surface of said filter;

A second spray mechanism positioned to clean an exterior surface of said filter, the position of said second spray mechanism being adjustable relative to said first spray mechanism and to said exterior surface of said filter;

Means for rotating said turntable and;

Means for supplying a washing liquid at a pressure above main pressure to said first and second spray mechanism.

2. Cleaning apparatus according to claim 1 further comprising third and fourth adjustable spray mechanisms connected to a source of rinsing water for rinsing said exterior of said filter.

3. Apparatus according to claim 1 wherein said first spray mechanism is mounted in said apparatus by means of a quick disconnect coupling to permit replacement of said first spray mechanism with spray mechanisms having different spray characteristics.

4. Apparatus according to claim 1 wherein said second spray mechanism has a plurality of washing nozzles each of said nozzles above a predetermined point being independently controllable in any combination thereof to provide an efficient spray with minimum expenditure of cleaning fluid and energy.

* * * * *